No. 792,666. PATENTED JUNE 20, 1905.
G. J. REED & A. MEIERHOFER.
VETERINARY DENTAL FLOAT.
APPLICATION FILED NOV. 15, 1904.
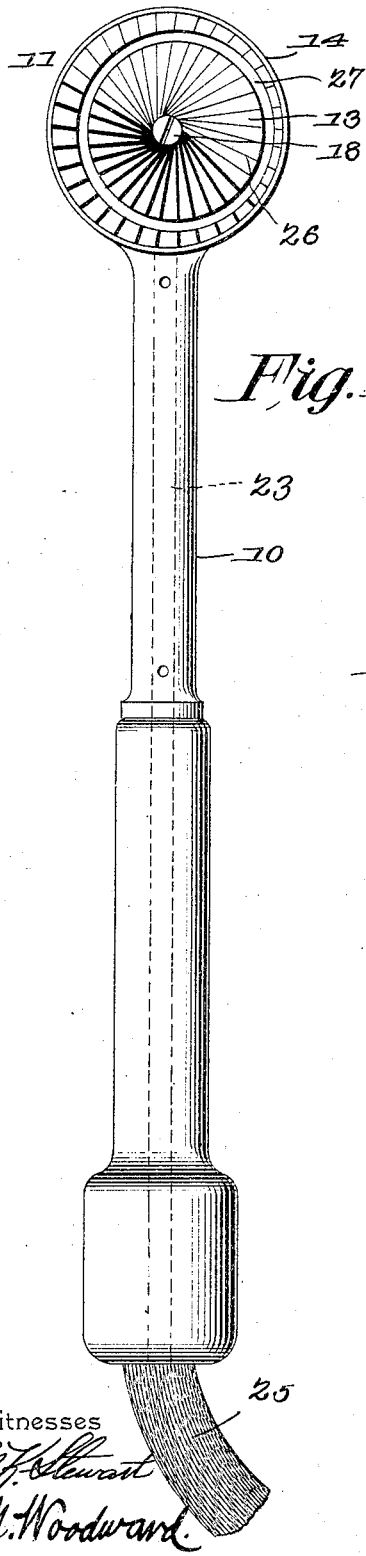
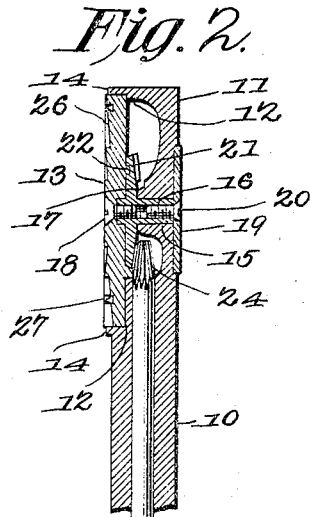
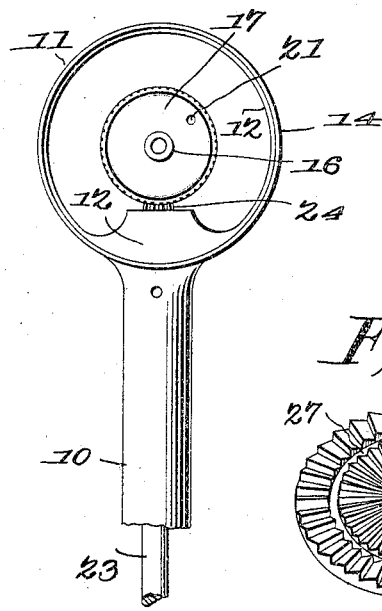
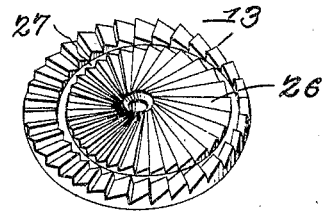
Witnesses
E. J. Stewart
C. N. Woodward
Garnet J. Reed and
Albert Meierhofer,
Inventors
by C. A. Snow & Co.
Attorneys No. 792,666. Patented June 20, 1905.

UNITED STATES PATENT OFFICE.

GARNET J. REED AND ALBERT MEIERHOFER, OF MINONK, ILLINOIS.

VETERINARY DENTAL FLOAT.

SPECIFICATION forming part of Letters Patent No. 792,666, dated June 20, 1905.

Application filed November 15, 1904. Serial No. 232,908.

*To all whom it may concern:*

Be it known that we, GARNET J. REED and ALBERT MEIERHOFER, citizens of the United States, residing at Minonk, in the county of Woodford and State of Illinois, have invented a new and useful Veterinary Dental Float, of which the following is a specification.

This invention relates to veterinary dental implements for filing, smoothing, leveling, and reducing the teeth of horses and other animals when required, and has for its object to improve the construction and increase the efficiency of devices of this character.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a plan view of the improved implement. Fig. 2 is a sectional elevation of the head portion of the implement. Fig. 3 is a plan view of the head portion with the abrading-disk removed. Fig. 4 is a detached perspective view of one of the abrading-disks.

The improved implement comprises an arm or stock 10, having at one end a circular hollow head 11, open at one side, and with an internal circular shoulder 12 to form a bearing for supporting a disk 13, having its outer surface provided with suitable abrading-furrows or the like, the disk thus being rotative upon the shoulder and supported from lateral movement by the annular rib 14, forming the terminal of one side of the head portion. Centrally of the head portion a transverse bearing 15 is formed, and rotatively engaging this bearing is the hub 16 of a bevel-gear 17, the hub of the gear being extended next to the disk 13 for entering a socket therein, as shown in Fig. 2.

The hub 16 of the gear 17 is internally threaded, and the disk 13 is secured thereon by a cap-screw 18, while a binding-plate 19 is secured by a cap-screw 20, passing through the plate and the rear side of the head portion 11 and into the hub 15 of the gear.

The gear 17 is provided with a cavity 21, in which a stud 22 on the rear side of the disk 13 fits when the parts are united to complete the coupling of the parts.

A rod 23 is mounted for rotation in the arm 10 and has formed on one end a pinion 24 for engaging the bevel-gear 17 and connected at the other end by suitable means to a flexible shaft, (indicated at 25,) by which means the rod is operated. By this simple means it is obvious that the disk 17 may be rapidly rotated for application to the tooth requiring attention and held in contact therewith and adjusted to any desired extent by the relatively long arm 10, which serves as a lever to assist in operating the device.

The disk 13 is provided with a plurality of tangentially-disposed furrows 26, forming the cutting or abrading surface, and provided with a circular channel 27 in the abrading-face, the channel being eccentric to the disk, so that as the disk is rotated the material cut from the tooth gathers in this channel and is thus prevented from clogging the disk, while at the same time by reason of the eccentric form of the channel its presence does not cause an irregular action, as will be obvious. The disk 13 by this arrangement is readily detachable by simply removing the screw 18 to enable disks with different abrading-surfaces to be substituted, and by furnishing a plurality of the disks of different forms or fineness of "dress" the scope of the implement may be increased to any required extent.

It will be noted that the furrows 26 extend above the inclosing rib 14, so that the whole surface of the disk is available for action on the tooth, and no danger exists of the rib interfering with the action.

Having thus described the invention, what is claimed is—

1. A veterinary dental float having an abrading-disk provided with tangential abrading-furrows and an eccentric channel intersecting the furrows, and means for operating said disk.

2. In a veterinary dental implement, a supporting-arm terminating in a circular socket, a disk mounted for rotation in said socket and provided with tangential abrading-furrows and with a circular channel in said furrows disposed eccentrically to said disk, and means operating through said arm for rotating said disk.

3. In a veterinary dental instrument, an arm having at one end a head provided with an internal circular shoulder, a disk having an abrading-surface and mounted for rotation upon said shoulder, and means operative through said arm for rotating said disk.

4. A veterinary dental float having a head provided with a socket, a gear mounted in the socket and having its hub extending rearwardly through a bearing in the head, means for detachably securing the hub of the gear in place, a disk detachably secured to the face of the gear and mounted in said socket, and operating means including a pinion meshing with said gear.

5. In a veterinary dental instrument, an arm having at one end a head provided with an internal circular shoulder and with a central transverse bearing, a gear having a hub extending through said bearing and likewise extending beyond the opposite face of the gear and internally threaded, a stop-plate bearing upon the rear face of said head and held in position by a cap-screw operating through said plate, and into said hub within said bearing, a disk having an abrading-surface, and mounted for rotation upon said shoulder, and provided with a socket for engaging the adjacent portion of said hub, and held in position by a cap-screw operating through said disk, and into said gear-hub, and with a stud extending into a cavity in said gear, a rod mounted for rotation in said arm, and terminating in a pinion for engaging said gear, and means for rotating said rod.

In testimony that we claim the foregoing as our own we have hereto affixed our signatures in the presence of two witnesses.

GARNET J. REED.
ALBERT MEIERHOFER.

Witnesses:
JOHN C. McINTOSH,
WM. MEIERHOFER.